June 22, 1943.  J. FISCHER  2,322,431
AUTOMOBILE ACCESSORY
Filed Nov. 29, 1940
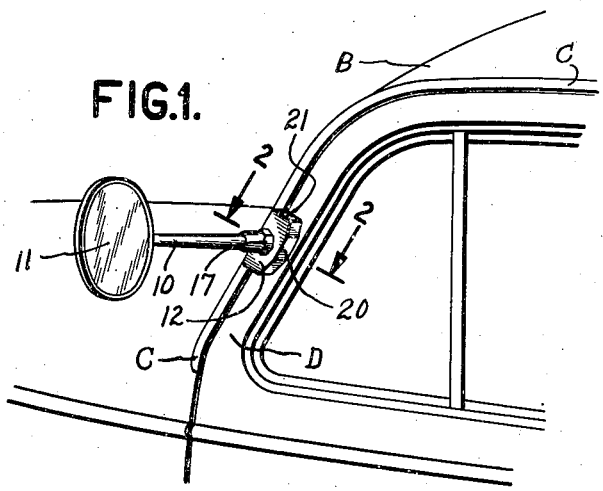
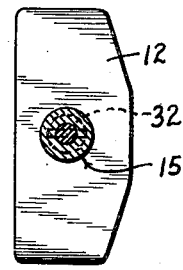
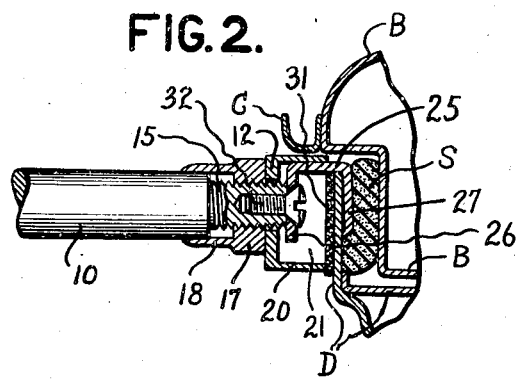
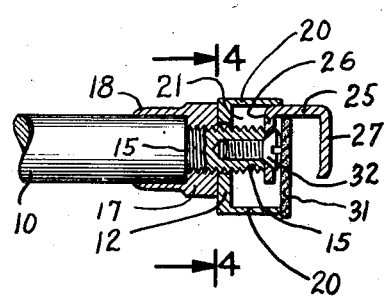
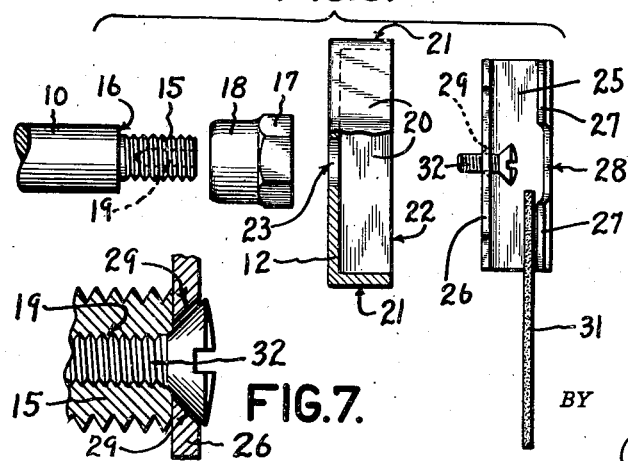
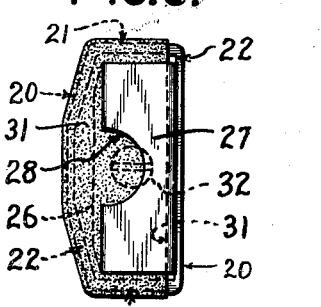
INVENTOR
JOSEPH FISCHER
BY James C. Ledbetter
ATTORNEY Patented June 22, 1943

2,322,431

UNITED STATES PATENT OFFICE 2,322,431

AUTOMOBILE ACCESSORY

Joseph Fischer, New York, N. Y.

Application November 29, 1940, Serial No. 367,693

2 Claims. (Cl. 248—226)

This invention relates to clamp and bracket fixture means comprising an automobile accessory for use in connection with mounting a mirror or thermometer or other fixture and accessory device in service position on a vehicle body.

An object of the invention is to produce a clamp and bracket means or automobile accessory embodying a minimum number of parts easy to assemble in the course of manufacturing the device and which is simple for one to install on the outside of his car in position conveniently to be observed by a person inside thereof, the device being adjustably interchangeable in a new manner thusly adapting it for ready installation on either side of a car.

A further object is to produce an accessory fixture having a new clamping means effecting a neat and close fit on the surface of a vehicle body, also lending itself to economical manufacture due to its component parts being of simple straight lines in design and construction, as well as a fixture holding steadfastly against vibration, and also incapable of being removed or stolen after it is installed on the margin of the closed and locked door of a motor car.

The accompanying drawing shows an example of the invention in its present preferred commercial form, wherein:

Figure 1 is a perspective view of the front left side of an automobile body, with the clamp and bracket fixture or accessory shown mounted in service position on the forward edge or margin of the door which is shown in closed position. The accessory is shown enlarged in relation to the door in order to more clearly explain the invention.

Figure 2 is a transverse sectional view taken on the line 2—2 through the clamp housing of the fixture installed on the vehicle door, the parts being shown approximately to normal scale or size.

Figure 3 shows a transverse sectional view of the clamp in open or loose (unscrewed) position, preliminary to being mounted and clamped in service position on a car.

Figure 4 is a section on line 4—4 looking at the top of the clamp housing, showing the supporting arm of the bracket in section where it joins the housing.

Figure 5 is a spread-out view of the clamp and bracket parts in separated alignment to show the individual form thereof and how they are to be assembled in the course of manufacturing the device.

Figure 6 is a bottom or inner view looking at the outer clamping jaw, as well as a gasket means adhering to the housing bottom edge, which parts are disposed outside of the clamp housing.

Figure 7 shows an enlarged fragmentary view of one satisfactory means of securing the accessory supporting arm to the clamp housing for angular adjustment in relation thereto.

This clamp and bracket fixture is especially designed and produced for automotive use, the requirements for which are of a specialized character due to factors of use, the desirability of making the accessory theft proof, the need for mounting it on either or both sides of the car without added parts being furnished with the clamp, and other conditions to be complied with which are special to the truck and passenger car field.

Referring more particularly to Figures 1 and 2, there is shown a vehicle or conventional car body B representing a member on which the accessory device is illustrated in service position. The automobile door D swings closed adjacent a drain channel C integral with the car body, now provided on many cars, over and along the edge of the door to drain away the water. My accessory device is shown mounted on the forward upper angular edge of the car door D and is adjustable so as to fit any door-margin angle. The device is adapted to be installed in this close fitting space, without in any way interfering with the opening and closing of the door. When the car body has the usual compressible weather strip S along the inside of the door edge, the jaw of the clamp is readily inserted under this soft strip without impairing the sealing function of said weather strip or holding ability of the clamp. Although the device is shown, by way of example, mounted on the vehicle door, it will be understood that it may be attached to other parts of a vehicle body or member.

It is seen that this accessory has a fixture-supporting arm 10, on the outer end of which is carried any suitable accessory device such as a rearvision mirror 11 or thermometer or other fixture means of good appearance and useful in connection with handling or driving motor cars and the like. The arm 10 may be arched gracefully from the rear of the mirror and brought back into symmetry so as to meet the plane of the door D at right-angles therewith. By reason of the angular adjustability of this clamp bracket, which makes it universally adaptable to both the right and left-hand side of a car, the mirror or other accessory device 11 only requires a limited amount of mobile adjustment on and in relation to the curved arm 10. Accordingly, it is unnecessary in this new construction to mount the mirror 11 rotatably upon its supporting arm 10. Thus the mirror or other accessory is attached to the outer end of the arm 10 by any suitable means (not shown), such as a tight swivel boss admitting of easy adjustment by hand. The driver of the car, therefore, may set the mirror to his eye and line of vision after the clamp means including a housing or cap in the form of a clamping cover 12 with its arm 10 are fixed in final position as to the correct height on the vehicle.

Reference is now made to all of the views showing an example of my invention in detail, as manufactured for the trade. The supporting bracket arm 10 has its inner extremity reduced to form a screw-threaded shank 15, thus providing a shoulder 16 defining the bottom end of the threads. A nut 17 is screwed upon the threads 15 and has an integral finishing sleeve or cuff 18 which fits the cylindrical extremity of the arm 10 so as to enclose the threads and provide a neat streamline form where the arm connects with the cap 12 when installed on a car. The shoulder 16 limits the position of the nut 17 and prevents it from being displaced outwardly on the arm when the car owner is loosening up the clamp (Figure 3) preliminary to installing the accessory on his car (Figures 1 and 2). A tapped hole 19 is made in the arm shank 15 by which to anchor the arm and cover or cap together, as later explained.

The clamp housing 12 has the general appearance of a hollow block and it forms an enclosing cap which closes or seals down over the clamp-operating means. This cap or clamping cover 12 has side walls 20 and end walls 21 which provide a straight line and smooth four-edge perimeter 22 all around the side and end walls and in the same plane defining an open bottom or side of the cap. In other words, the housing bottom or inner edge 22 is smooth and not interrupted with recess or notch means so frequently employed in devices of this kind. By reason thereof, the cap achieves a closer and neater fit and makes an improved finish when installed on an automobile.

The reference number 12 indicates the housing cap generally and also designates its top wall. This cap has an aperture 23 formed through its top wall, preferably in the center thereof for symmetry and equalization of the strain incident to clamping the accessory in service position. It is noted that the cap has its outer or top wall surface 12 and its bottom edge 22 formed preferably in parallel planes as to make for a simple and inexpensive construction of pleasing appearance.

Next, there is provided a simple form of elongated U-shaped clamping hook or yoke member, indicated generally at 25, having an inner flange or clamp operating part 26 and an outer flange or clamping jaw 27. The reference number 25 also may be considered as pointing to the web or front integral portion which joins the parallel flanges 26 and 27 in spaced relation, say about one-half inch apart, more or less, in one of the more popular commercial sizes of this device. The inner flange 26 functions as a clamp-operating member, while the outer flange 27 acts as a clamping jaw. In fact, the four-sided or rectangular cap edge 22 in one plane constitutes one clamping jaw, while the outside flange 27 of the U-shaped part is the other clamping jaw, and these two jaws are adapted to straddle the member on which the clamp is installed.

The outer flange 27 may be stamped with a cut-out 28 to form a segmental notch therein for the purpose of facilitating assembly when the device is made according to the illustrated example of the invention. The inner flange 26 is centrally punched to provide a screw-receiving hole 29 which registers with the tapped hole 19 formed in the threaded extremity or shank 15 of the bracket arm 10.

The clamp-operating flange 26 is preferably made to have an inside loose sliding fit with the smooth inner walls of the cap 12. Accordingly, the flange 27 is here illustrated as being substantially equal in length and width to that of the inside of the cap 12. However, this inside flange 26 merely functions to tie the U-shaped member 25 with the arm 10 and consequently may be reduced in size if desired. The structural shapes and relations herein illustrated merely show one of the preferred types of construction. It is important to note that the side web 25 of the U-shaped part operates in sliding engagement with the inside surface of the side wall of the cap 12. This shows that the clamping hook front portion 25 is covered by and projects neatly from the open bottom of the cap, instead of protruding from the front side thereof.

There is also provided a gasket 31 of general rectangular shape, that is, of a shape suitable to apply against the bottom plane edge 22 of the cap 12. The general contour of both the gasket 31 and the cap 12 is shown in Figure 6, wherein it is noted that the gasket is slightly longer than the cap, as well as having its outer or left-hand edge slightly wider than the cap. Thus, there may be a fraction of an inch overhang of the gasket around three sides of the cap edge 22. A metal-to-rubber or other cement or adhesive is satisfactory to attach a rubber or other selected gasket material 31 to the cap edge 22 for holding the gasket in place (Figure 3) until the device is installed. The gasket 31 (in Figure 5) is shown in connection with the U-shaped part 25 merely as a member of this disassembled view, but it will be apparent that the gasket may be set adhesively on the cap edge 22 after the inside flange 26 is attached to the shank 15.

In explaining the assembly of the parts heretofore described to complete the accessory, reference is also made to the cross sectional views, particularly Figures 3 and 7. The nut 17 is run back on the threaded shank 15 of the arm and the latter is inserted through the cap hole 23. Then a screw 32 is inserted through the flange hole 29 and screwed home into final position in the tapped hole 19 of the shank. The U-shaped member 25 is now well within its enclosing cap and is joined to the arm 10. This new cap covers a major portion of the U-shaped member 25 with the result that the parts are well enclosed.

It is noted that the screw hole 29 is sufficiently large through the flange 26 to permit the screw head 32 to seat or jam against the end face of the threaded shank 15 without jamming the flange 26. Accordingly, this flange is positively connected with the arm 10 but is rotatable relatively thereon. Therefore, the cap 12 with its U-shaped member 25 is free to undergo a manually adjustable turning or angular motion on the arm 10. This method of positively tying or anchoring the U-shaped part 25 with the threaded shank extremity 15 is better shown by the enlarged Figure 7.

The counter-sunk screw-head type of fastening means shown at 32 is very good for this job because its conic base tightens against the end face of the shank 15 and locks it without clamping the flange 26. The flange hole 29 of screw clearance size may be straight punched and need not necessarily be countersunk as shown in the drawing. This structural form is merely an example of one satisfactory method adopted for production, as regards tying the two parts 25 and 10 together to permit the cap 12 to be adjustably turned in attaining proper location on the door edge D before finally clamping the device in final position.

If desired, the inner extremity of the arm 10 may be inserted rotatably through the cap 10 and flange 26 and then peened or riveted over on the outer side of the flange 26 which dispenses with the use of the screw 32. Also, a shouldered screw may be used to lock the flange 26 free for angular adjustment onto the end 15 of the arm.

It will be noted that the straight front wall 20 of the clamping cover and front wall 25 of the yoke are arranged in parallel surface engagement with each other in a plane which is also parallel with the axis of the screw means comprising the nut 17 and threaded arm portion 15. This arrangement means that the front side 25 of the yoke maintains a closing engagement with and along the inner edge of the front wall 20 throughout the sliding engagement of these parts. Accordingly, the front side of the clamping cover remains closed throughout the operating range of the screw means.

In order to install the accessory on a car, loosen the nut 17, 18 (Figure 3), open the car door D so as to make its edge accessible, insert the clamp jaw 27 behind the door edge (Figure 2), and then preliminarily run the nut down on the cap 12. The clamping means thusly straddles the door edge, the flange 27 acts as one jaw and the cap edge 22 with its gasket 31 as the other jaw. The weather strip S, if adhesively carried on the door edge, is lifted just enough to permit insertion of the jaw flange 27 thereunder.

With the nut 17 set easily against the cap 12, the fixture is adjusted up or down to suit your line of vision; also the arm 10 is rotated in the cap to set the mirror 11 rearwardly. The nut is now finally tightened by a wrench against the cap, this operation causing the two clamp jaws 22 and 27 to forcibly draw toward each other to grip the door edge and lock the fixture in final position.

The latter mentioned angular adjustment (that of turning the arm 10 in the cap 12 to face the mirror rearwardly) permits the adaptation of this accessory to either the right or left side of the car. The better practice is to install two mirror brackets on the car, one on each side in order that both the driver and passenger may command a view of the rear of the road without looking back. Driving safety is thus increased.

It is observed that the cap 12 and its gasket 31 makes a close and smooth fit against the surface of the door or car body. Since the screwing of the nut 17 outwardly on the shank 15 (toward the cap 12) acts as to simultaneously force the cap against the outer surface of the door and draw the jaw 27 against the inside of the door, it follows that the gasket 31 not only compresses and makes a sealed fit but protects the finish on the car. The gasket also relieves rigidity so that if a person outside the car carelessly pulls or hangs on the arm 10 there is less likelihood of denting the door edge.

The clamping means has been so designed and constructed that the cap 12 (its jaw edge 22) has a space-closing engagement with the surface of the vehicle body. In other words, when the clamping means is tightened, the cap 12 does not pull away from the surface of the member on which it is installed, a fault which has been observed in other clamps and which leaves an unsightly finish and which does not so readily lend itself to washing or wiping the car surface around the clamp.

It is seen that the fixture is theft-proof, in that with the car door D locked, the fixture cannot be detached from the door. This is true even though the nut 17 is loosened, since the arm 10 cannot be removed from the cap 12 without first gaining access to the parts therein.

The advantages afforded by this invention have been attained by the particular form and construction of my improved clamp housing cap 12, together with its cooperating parts. The new combination as such makes it possible to mount the mirror 11 on the outer end of the arm 10 in a simple way, and permit the car owner to purchase two fixtures of the same construction and mount each one on each side of his car.

This invention is presented to fill a need for a new and useful automobile accessory. It is understood that various modifications in construction, operation, use and method, may and often do occur to those skilled in the art, especially after benefiting from the teachings of an invention, and that this disclosure with its appended claims are descriptive of the principles but not limited to the illustrated embodiment of the invention.

What is claimed is:

1. An automotive accessory device comprising a clamping cover adapted to seat against the outer surface of a car door, a U-shaped yoke adapted to straddle the car door flange, and having an operating portion mounted within the clamping cover, and also having a clamping jaw disposed outside thereof behind the door flange, an arm extending outwardly from the clamping cover and supporting a car fixture; screw means carried by the device, in operative relation with the clamping cover and with the yoke, for drawing the jaw into clamping engagement with the door flange; a front wall formed on the clamping cover, cooperating plane surfaces on said front wall of the clamping cover and on the front wall of the yoke in sliding engagement with each other, the plane of said surface engagement being parallel with the axis of the screw means, whereby said two front walls have surface engagement, to close the front of the clamping cover, throughout the range of operation of the screw means.

2. An automotive accessory device comprising a clamping cover adapted to seat against the outer surface of a car door, and including a straight front wall disposed at the edge of the door, a U-shaped yoke having an operating flange mounted in the clamping cover, and also having a clamping jaw disposed outside thereof which reaches behind the door edge and engages the inner side of said door, coaxial apertures provided through the clamping cover and the operating flange, an arm carrying a fixture and having a threaded end movably mounted through the housing aperture, means connecting the threaded end of the arm with the aperture of the operating flange affording angular adjustment of said arm in relation to the clamping cover, an operating nut on the threaded end of the arm bearing against the housing for drawing the clamping jaw against the inner side of the door and for locking the arm in its angularly adjusted position, the front wall of the clamping cover and the front portion of the yoke presenting plane surfaces in sliding engagement with each other, and the plane of said surface engagement being parallel with the axis of the operating nut to close the edge of the front wall of the clamping cover throughout the range of said sliding engagement.

JOSEPH FISCHER.